United States Patent
Yazawa et al.

(10) Patent No.: US 8,205,534 B2
(45) Date of Patent: Jun. 26, 2012

(54) CUTTING METHODS AND CUTTING APPARATUS

(75) Inventors: Takanori Yazawa, Nagasaki (JP); Keiichi Ishikawa, Nagasaki (JP); Kou Mineta, Nagasaki (JP)

(73) Assignee: Nagasaki University (JP)

( * ) Notice: Subject to any disclaimer, the term of this patent is extended or adjusted under 35 U.S.C. 154(b) by 592 days.

(21) Appl. No.: 12/306,924

(22) PCT Filed: Jun. 27, 2007

(86) PCT No.: PCT/JP2007/062923
§ 371 (c)(1),
(2), (4) Date: Aug. 25, 2009

(87) PCT Pub. No.: WO2008/001816
PCT Pub. Date: Jan. 3, 2008

(65) Prior Publication Data
US 2009/0320658 A1 Dec. 31, 2009

(30) Foreign Application Priority Data
Jun. 30, 2006 (JP) ................................ P2006-182387

(51) Int. Cl.
*B23D 55/00* (2006.01)
(52) U.S. Cl. ........................................ 83/651.1; 83/789
(58) Field of Classification Search ................ 83/651.1, 83/789, 798, 795, 810; 219/69.12
See application file for complete search history.

(56) References Cited

U.S. PATENT DOCUMENTS

| 2,855,043 A | * | 10/1958 | Opferkuch | 83/263 |
| 4,393,450 A | * | 7/1983 | Jerard | 700/163 |
| 4,909,108 A | * | 3/1990 | Nakada et al. | 83/76.9 |
| 5,220,729 A | * | 6/1993 | Gallant | 30/380 |
| 7,637,189 B2 | * | 12/2009 | Schlusselbauer | 83/171 |

FOREIGN PATENT DOCUMENTS

| JP | 46-9393 | 3/1971 |
| JP | 50-27188 | 3/1975 |
| JP | 51-91077 | 8/1976 |
| JP | 56-171132 | 12/1981 |
| JP | 5-248102 | * 9/1993 |
| JP | 10-128737 | 5/1998 |
| JP | 10-340868 | 12/1998 |
| JP | 11-198019 | 7/1999 |
| JP | 2002-321188 | 11/2002 |

* cited by examiner

*Primary Examiner* — Kenneth E. Peterson
(74) *Attorney, Agent, or Firm* — David R. Stevens; Stevens Law Group

(57) ABSTRACT

The present invention provides cutting methods and cutting apparatus that can precisely cut workpieces in complicated shapes with high aspect ratios regardless of materials of the workpieces. The present invention is cutting methods and cutting apparatus using a wire saw wherein cutting processing is performed for a workpiece by extending a cutting wire on a cutting arm that rotates around a wire's center axis or a real cutting position relative to a fixed section and rotating the cutting arm such that a cutting direction of the wire matches a support direction of a total stiffness that supports the wire.

12 Claims, 11 Drawing Sheets

CUTTING METHODS AND CUTTING APPARATUS

RELATED APPLICATION DATA

The present application claims the priority benefit of, Japanese Patent Application JP P2006-182387 filed on Jun. 30, 2006 and Japanese PCT/JP2007/62923 filed on Jun. 27, 2007.

TECHNICAL FIELD

The present invention relates to cutting methods and cutting apparatus for workpieces. In particular, the present invention relates to cutting methods and cutting apparatus using a wire, a so-called wire saw, that cuts workpieces in complicated shapes.

BACKGROUND ART

FIG. 13 shows an outlined structure of a cutting method for workpieces using a conventional wire saw. As shown in FIG. 13, in a conventional wire saw, a workpiece cutting wire 2 supplied from a wire supply/collection unit (not shown) is wound in coil shapes around a plurality of grooved rollers 3 (3A, 3B, 3C) and then collected to the wire supply/collection unit. When a workpiece 4 such as silicon ingot or crystal is cut, while slurry abrasive solution 5 containing lapping oil and free abrasive grains is being supplied from a slurry nozzle 6, the workpiece 4 fixed on a plate of a pressing section 7 is pressed to a wire train that is reciprocally traveled at high speed among the grooved rollers 3 (3A, 3B, 3C). As a result, the workpiece 4 is cut into many silicon wafers and oscillators by abrasive action of free abrasive grains. The waste slurry abrasive solution 5 is collected to a collection vessel 8.

Cutting methods for workpieces using a wire saw are disclosed, for example, in Patent Documents 1, 2, and 3.

Patent Document 1, Japanese Unexamined Patent Application Publication No. HEI 11-198019
Patent Document 2, Japanese Unexamined Patent Application Publication No. HEI 10-128737
Patent Document 3, Japanese Unexamined Patent Application Publication No. HEI 10-340868

DISCLOSURE OF THE INVENTION

Thus, wire saws can effectively cut workpieces into a plurality of portions having a straight shape at the same time. In addition, wire saws can cut workpieces into portions having a fine cutting width and a high aspect ratio and can be used for those regardless of their materials. However, if a wire saw tries to cut a workpiece in a complicated shape such as a free curved surface, the direction of processing force that occurs due to cutting changes. As a result, the wire may be disengaged from the respective grooves of the grooved guide rollers or the wire may be broken. Thus, there is a problem that wire saws are difficult to cut workpieces in complicated shapes.

Conventionally, workpieces are cut in complicated shapes by jig sawing, wire electrical discharging, laser processing, and water jet processing. Among them, jig sawing has hardly been used for precise cutting because of drawbacks of which processing force is large, burring tends to occur due to rough cutting surface, and the size of jig sawing as a tool prevents handling of fine curves.

Wire electrical discharging is a processing method using arc discharging of a high voltage applied between a wire and a workpiece. Thus, processing force is not directly transferred to the wire. As its features, wire electrical discharging can process workpieces regardless of their hardness. It can easily cut workpieces into portions having high aspect ratios thus into those having complicated shapes. However, wire electrical discharging has critical problems in which it damages the front surface of workpieces due to heat generated during processing and the processing speed is slow. In addition, as a critical problem, wire electrical discharging cannot theoretically cut workpieces that are not electroconductive.

Laser processing is a processing method in which laser such as $CO_2$ laser, YAG laser, or excimer is condensed by a condenser lens and the resultant high energy laser is irradiated to a workpiece. Thus, laser processing can cut workpieces made of a wide range of materials and can easily process them in complicated shapes. However, since energy density of laser is increased by condensing light, laser processing is difficult to cut workpieces into portions having high aspect ratios. When laser processing cuts translucent materials such as glass, they need to be carefully processed with much knowhow.

Water jetting is a processing method in which a workpiece is cut by spraying water containing fine abrasive grains at high pressure to a workpiece. Thus, although water jetting can easily process workpieces having complicated shapes regardless of their materials, since it has a large energy loss, it cannot precisely cut workpieces into portions having high aspect ratios.

Although etching and FIB may be used for cutting processing, they depend on materials of workpieces and high aspect ratios, they are difficult to be applied for specially fine structures.

Thus, cutting methods of cutting workpieces in complicated shapes with high aspect ratios and fine cutting widths regardless of their materials have been desired.

From the foregoing point of view, the present invention provides cutting methods and cutting apparatus that can cut workpieces in complicated shapes regardless of their materials.

A cutting method according to the present invention is a cutting method using a wire saw, characterized in that a cutting wire is extended on a cutting arm rotated around a center axis of the wire relative to a fixed section, the cutting arm is rotated such that a cutting direction of the wire matches a support direction of a total stiffness that supports the wire, and cutting processing is performed for a workpiece.

A preferable mode of a cutting method according to the present invention is the foregoing cutting method, characterized in that the cutting arm is rotatably supported with a fixed rotation mechanism, the wire is extended between a pair of grooved guide rollers disposed on the cutting arm, and the wire is traveled.

In the cutting methods of the present invention, since cutting processing is performed for a workpiece by rotating the cutting arm such that the cutting direction is matched with the support direction of the total stiffness that supports the wire, it can be cut in any shape.

Another cutting method according to the present invention is a cutting method using a wire saw, characterized in that a cutting wire is extended on a cutting arm that rotates relative to a fixed section, a center of rotation of the cutting arm is matched with a real cutting position where the wire always contacts the workpiece, the cutting arm is rotated such that a cutting direction of the wire matches a support direction of a total stiffness that supports the wire, and cutting processing is performed for the workpiece.

A preferable mode of a cutting method according to the present invention is the foregoing cutting method, characterized in that the cutting arm is rotatably supported with a fixed rotation mechanism, and the wire is extended between a pair of grooved guide rollers disposed on the cutting arm, and the wire is traveled.

A preferable mode of a cutting method according to the present invention is the foregoing cutting method, characterized in that a displacement amount is detected between the center of rotation of the cutting arm and a real cutting position of the wire, and the wire cutting position is controlled such that it matches the center of rotation of the cutting arm based on the displacement amount.

Controlling the real cutting position of the wire is performed by detecting a tension of the wire.

Controlling the real cutting position of the wire is performed by directly detecting the real cutting position.

In the cutting methods of the present invention, since cutting processing is performed by matching the center of rotation of the cutting arm with the real cutting position where the wire always contacts a workpiece, even if the cutting direction is changed, cutting processing can be precisely performed without abnormality at the position where the cutting direction was changed. At the same time, since cutting processing is performed by rotating the cutting arm such that the cutting direction is matched with the support direction of the total stiffness that supports the wire, cutting can be performed in any shape.

A cutting apparatus according to the present invention is a cutting apparatus using a wire saw, characterized in that the cutting apparatus includes a cutting arm that extends a cutting wire such that it is capable of travelling, and a fixed rotation mechanism to rotatably support the cutting arm around a center axis of the wire, when a workpiece is cut, cutting processing is performed by rotating the cutting arm such that a cutting direction of the wire matches a support direction of a total stiffness that supports the wire.

A preferable mode of a cutting apparatus according to the present invention is the foregoing cutting apparatus, characterized in that the cutting apparatus further includes a cutting wire supply/collection unit, a pair of grooved guide rollers that guide the wire being disposed on the cutting arm, the wire being extended between the pair of grooved guide rollers such that the wire reciprocally travels therebetween.

Since the cutting apparatus of the present invention includes the cutting arm that extends the cutting wire such that it can travel and the rotation mechanism that supports the cutting arm such that it can be rotated around the wire's center axis, when a workpiece is cut, by rotating the cutting arm such that the cutting direction is matched with the support direction of the total stiffness that supports the wire, it can be cut in any shape.

A cutting apparatus using a wire saw, characterized in that the cutting apparatus includes a cutting arm that extends a cutting wire such that it is capable of traveling, a fixed rotation mechanism, an X-Y moving mechanism disposed on the rotation mechanism and on which the cutting arm is fixed, and control means for controlling the X-Y moving mechanism, when a workpiece is cut, the X-Y moving mechanism being controlled such that a center of rotation of the cutting arm matches a real cutting position where the wire always contacts the workpiece, cutting processing being performed by rotating the cutting arm through the rotation mechanism such that a cutting direction of the wire matches a support direction of a total stiffness that supports the wire.

A preferable mode of a cutting apparatus according to the present invention is the foregoing cutting apparatus, characterized in that the cutting apparatus further includes a cutting wire supply/collection unit, a pair of grooved guide rollers that guide the wire being disposed on the cutting arm, the wire being extended between the pair of grooved guide rollers such that the wire reciprocally travels therebetween.

A preferable mode of a cutting apparatus according to the present invention is the foregoing cutting apparatus, characterized in that a displacement amount between the center of rotation of the cutting arm and the real cutting position of the wire is detected, the X-Y moving mechanism is controlled by the control means based on the displacement amount, and the real cutting position of the wire is matched with the center of rotation of the cutting arm.

A preferable mode of a cutting apparatus according to the present invention is the foregoing cutting apparatus, characterized in that a strain sensor that detects the real cutting position of the wire from a tension of the wire is disposed on the cutting arm.

A preferable mode of a cutting apparatus according to the present invention is the foregoing cutting apparatus, characterized in that the cutting apparatus further includes optical detection means for detecting the real cutting position of the wire.

The other cutting apparatus of the present invention includes a cutting arm that extends a cutting wire such that it is capable of traveling, a fixed rotation mechanism, an X-Y moving mechanism, and control means. When a workpiece is cut, the X-Y moving mechanism is controlled such that a center of rotation of the cutting arm matches a real cutting position where the wire always contacts the workpiece, even if the cutting direction is changed, cutting processing can be precisely performed without abnormality at the position where the cutting direction was changed. At the same time, since cutting processing is performed by rotating the cutting arm such that the cutting direction is matched with the support direction of the total stiffness that supports the wire, cutting can be performed in any shape.

The cutting methods and cutting apparatus of the present invention can cut workpieces in complicated shapes regardless of their materials.

The other cutting methods and cutting apparatus of the present invention can more precisely cut workpieces in complicated shapes regardless of their materials.

BEST MODES FOR CARRYING OUT THE INVENTION

Figure 1C:
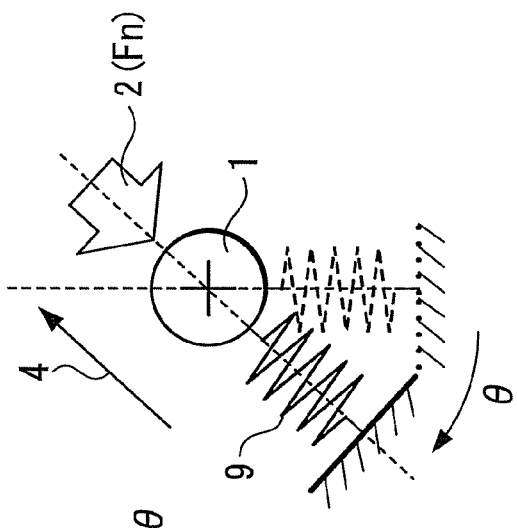
FIG. 1A to C are schematic diagrams describing the theory of a cutting method according to the present invention.

A cutting method according to an embodiment of the present invention is a cutting method using a cutting wire; a cutting arm composed of a pair of grooved guide rollers, and a wire travelling guide; and a rotation mechanism that rotates the cutting arm. The cutting arm is rotated around the wire that travels a cutting portion of a workpiece by the rotation mechanism. The workpiece is cut such that the cutting direction of the wire always matches the support direction of the total stiffness that supports the wire. In other words, the cutting method according to this embodiment is a cutting processing method in which cutting is performed while the cutting direction is kept in the vertical direction of the rotation axis of a pair of grooved guide rollers. Next, with reference to FIGS. 1A to C, the theory of the cutting method of this embodiment will be described.

In FIG. 1, reference numeral 1 represents a cutting wire and reference numeral 2 represents a processing force Fn caused by cutting. Reference numeral 3 represents a total stiffness Ka that supports the wire 1 and is composed of grooved guide rollers 54 and 55, a rotation axis (not shown) of a cutting arm 33, and support stiffnesses that support them as will be described with reference to FIG. 2. Reference numeral 4 represents a feed direction of the wire 1.

Figure 1B:
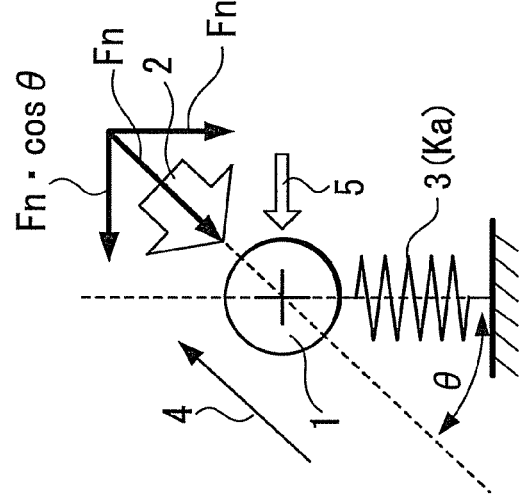
Figure 1A:
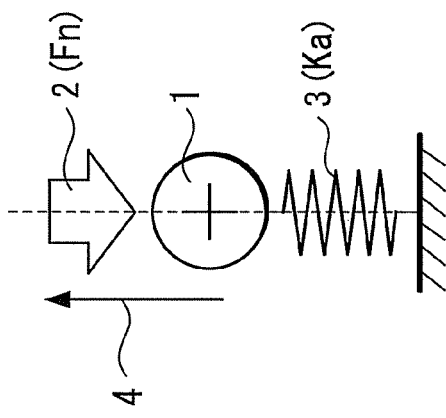

FIG. 1A shows a dynamic model of which a workpiece is cut in a straight shape by a single wire 1. A processing force (Fn) 2 that is generated by cutting is supported by the total stiffness (Ka) that supports the wire 1 and a stiffness (Kw) of the wire 1. In this case, the direction of the processing force (Fn) 2 matches the support direction of the total stiffness (Ka) that supports the wire 1.

If cutting for a curved shape is performed, as shown in FIG. 1B, the direction of the processing force (Fn) 2 changes depending on the cutting direction. The direction of the processing force (Fn) 2 matches the feed direction 4 of the wire 1. If the angle made by the direction of the processing force (Fn) 2 and the support direction of the total stiffness (Ka) 3 is denoted by θ, a force 5 corresponding to a vertical component Fn·cos θ and a horizontal component Fn·sin θ of the processing force (Fn) supported by the total stiffness (Ka) 3 occurs in the wire 1. At this point, the wire 1 is supported by the grooves of the grooved guide rollers and the stiffness (Fw) of the wire 1. However, when the angle θ becomes large, since the force 5 of the horizontal component becomes large, the grooves of the grooved guide rollers cannot support the wire 1, resulting in causing the wire 1 to be disengaged from the grooves or to be broken.

Thus, as shown in FIG. 1C, the support direction of the total stiffness (Ka) 3 is rotated around the center axis of the wire 1 corresponding to the cutting direction such that the relationship of θ=0° is always kept. Now, it is defined that the center axis of the wire (so-called, wire's center axis) is an axis 51 that matches a wire 32 vertically extended between the pair of grooved guide rollers 54 and 55 shown in FIG. 3. Thus, since the force 5 of the horizontal component does not occur, nor does the problem described with reference to FIG. 1B occur.

Next, with reference to the accompanying drawings, an embodiment of the present invention will be described.

Figure 2:
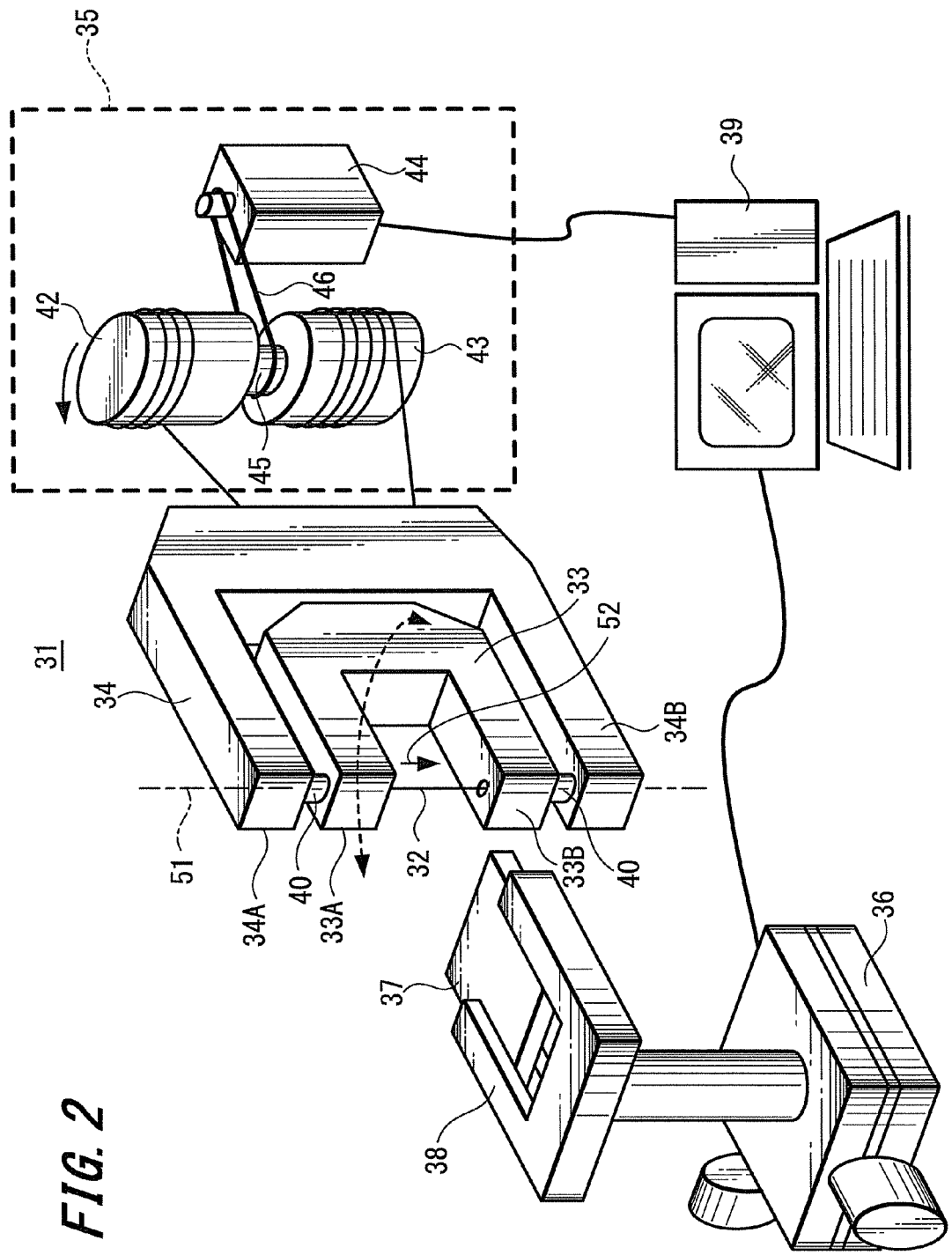
FIG. 2 is a schematic diagram showing an outline of a first embodiment of a cutting apparatus according to the present invention.

FIG. 2 shows an outlined structure of a first embodiment of a cutting apparatus that uses the cutting method according to the present invention. A cutting apparatus 31 according to this embodiment includes a cutting arm 33 having a cutting wire 32; and a rotation mechanism 34 that rotates the cutting arm 33 around a center axis 51 of the wire 32. In addition, the cutting apparatus 31 includes a wire supply/collection unit 35; an orthogonal three-axis moving table 36 having one axis of a wire travelling direction 52 of a cutting portion of a workpiece 37; a chucking device 38 holding the workpiece 37 integrally supported on the moving table 36; and a control means, for example, a computer 39, that issues commands to the wire supply/collection unit 35, the rotation mechanism 34, and the moving table 36.

Figure 3:
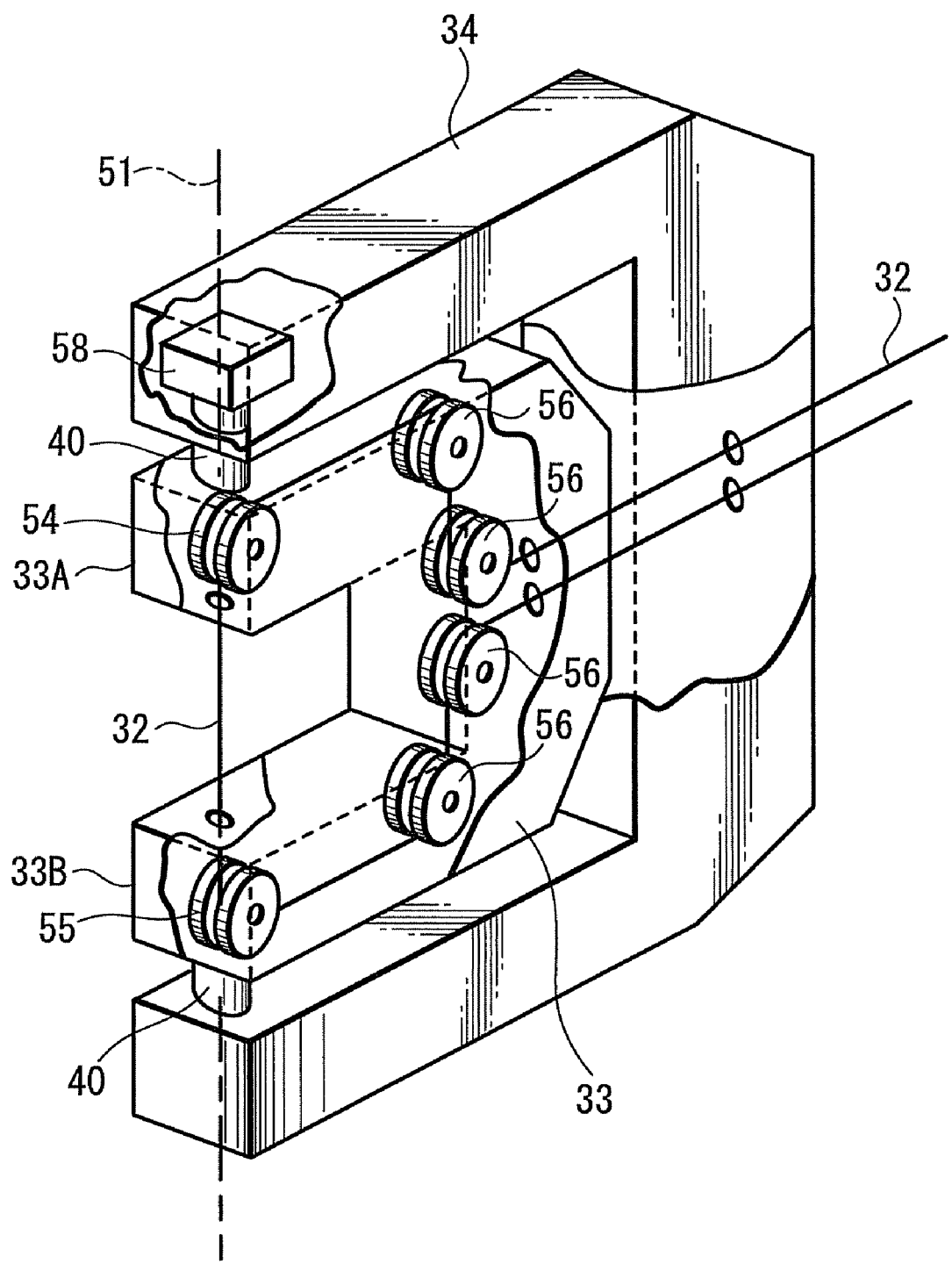
FIG. 3 is a partial exploded perspective view showing a cutting arm and a rotting mechanism of FIG. 2.

As shown in FIG. 3, the cutting arm 33 is formed, for example, in a "]" letter shape (one-shorter-side-open rectangular shape). Disposed on the respective distal sides of upper and lower arm sections 33A and 33B in the cutting arm 33 are the two grooved guide rollers 54, 55 and traveling guides 56 for the wire 32 and the cutting wire 32 is extended between the upper and lower arm sections 33A and 33 such that the cutting wire 32 is exposed. The cutting arm 33 is rotatably held on the respective distal sides of the upper and lower arms sections 33A, 33 by the rotation mechanism 34.

The wire 32 is supplied from a feed drum 42 of the wire supply/collection unit 35 that will be described later, inserted from the rear of the cutting arm 33, guided by traveling guides 56, and then run on the groove of the grooved guide roller 54 disposed in the upper arm section 33A. Thereafter, the wire 33 is exposed from the upper arm section 33A to the outside, entered into the lower arm 33B such that the wire 32 is vertically extended, and then guided to the groove of the grooved guide roller 55. Thereafter, the wire 33 is guided by traveling guides 56 in the lower arm 33B and then wound by a takeup drum 43 of the wire supply/collection unit. The wire 32 is reciprocally traveled. The cutting arm 33 has functions of supporting the wire 32, the grooved guide rollers 33A, 33B, the traveling guides 56, and so forth and integrating them.

As the wire 32, a wire with abrasive grains may be used. Alternatively, an abrasive solution supply nozzle may be disposed such that a slurry abrasive solution is supplied to the wire.

The rotation mechanism 34 has a function of rotating the cutting arm 33 around the wire's center axis 51 and includes a rotation motor 58 that operates according to a rotation command received from the computer 39; and a rotation bearing 40 for the cutting arm 33.

In other words, the rotation mechanism 34 is composed, for example, of a "]"-letter-shaped section and is structured such that the rotation mechanism 34 rotatably supports the "]"-letter-shaped cutting arm 33 disposed inside the "]"-letter-shaped section of the rotation mechanism 34. The rotation mechanism 34 is fixedly disposed. The cutting arm 33 is rotatably supported by upper and lower arm sections 33A, 33B of the rotation mechanism 34 composed of the "]"-letter-shaped section through the rotation axis (not shown) and a rotation bearing 40 that are coaxial to the wire's center axis 51. The rotation mechanism 34 drives the rotation motor 58 according to a rotation command received from the computer 39 to rotate the cutting arm 33 around the rotation axis (namely, coaxial to the wire's center axis 51).

The wire supply/collection unit 35 is composed of the feed drum 42 that feeds the wire 32; the takeup drum 43 that takes up the wire 32; a drive motor 44 that rotates both the drums 42 and 43; and a tension control device (not shown) that controls the tension of the wire 32 according to a command received from the computer 39. They are integrated in the wire supply/collection unit 35. The tension control device is structured to control a rotation load applied to the feed drum 42.

In this example, the feed drum 42 and the takeup drum 43 are coaxially and integrally connected through a connection section 45. The connection section 45 and the drive motor 44 are connected through a drive belt 46. Thus, by driving the drive motor 44, the feed drum 42 and the takeup drum 43 are simultaneously rotated. As a result, the wire 32 wound around the feed drum 42 is supplied therefrom and wound to the takeup drum 43. In this structure, the tension control device may be structured by a control mechanism of the load torque of the drive motor 44. In other words, the load torque of the drive motor 44 is controlled according to a command received from the computer 39 to control the tension of the wire 32.

As another example, the feed drum 42 may be structured to have a brake that controls the rotation load of the feed drum 42 according to a command received from the computer 39. In this case, the feed drum 42 and the takeup drum 43 are slidably connected.

The cutting apparatus 31 of this embodiment controls the rotation angle of the rotation motor (not shown) according to a command received from the computer 39 such that the posture of the cutting arm always matches the wire feed direction. At this point, the rotation load applied to the feed drum 42 is controlled by the tension control device according to a command received from the computer 39 such that the tension applied to the wire 32 does not change.

Next, a cutting method will be described as well as an operation of the cutting apparatus 31 according to the first embodiment. The workpiece 37 is chucked and held by the chucking device 38. Thereafter, a cutting portion of the workpiece 37 is moved to the center of the wire 32 of the cutting arm 33 and the workpiece 37 is pressed to the wire 32.

Thereafter, the moving direction of the moving table 36 is controlled by the computer 39 such that a processing force of the wire 32 is applied to the cutting direction of the workpiece 37. At the same time, the cutting arm 33 is rotated by a desired angle θ around the rotation axis (identical to the wire's center axis 51) (see FIG. 2C) such that the feed direction of the wire 32 matches the direction of the processing force of the wire 32 according to a command received from the computer 39. In this state, cutting processing is performed. When the cutting direction is changed, the direction of the processing force of the workpiece 37 is correspondingly changed through the moving table 36. At the same time, the cutting arm 33 is rotated only by a predetermined angle θ such that the support direction of the total stiffness (Ka) that supports the wire of the grooved guide rollers 54, 55 and so forth matches the direction of the processing force and then cutting processing is performed.

In the cutting processing method and the cutting apparatus according to the first embodiment, as well as cutting processing for a straight shape, cutting processing for complicated shapes such as a sine shape and a free curve with high aspect ratios and fine cutting widths can be performed. In addition, cutting processing can be performed regardless of materials of workpieces such as conductive materials and non-conductive materials.

Since the support direction of the total stiffness (Ka) that supports the wire 32 such as the grooved guide rollers 54, 55, and so forth is matched with the processing force (Fn), the wire that is disposed along the grooves of the grooved guide rollers 54, 55 does not abrade the groove walls. If the cutting processing is performed in the state shown in FIG. 1B, when the horizontal component Fn·sin θ of the processing force Fn becomes large, the groove walls of the grooved guide rollers are adversely abraded by the wire. However, in the first embodiment, such a problem can be prevented.

Figure 4:
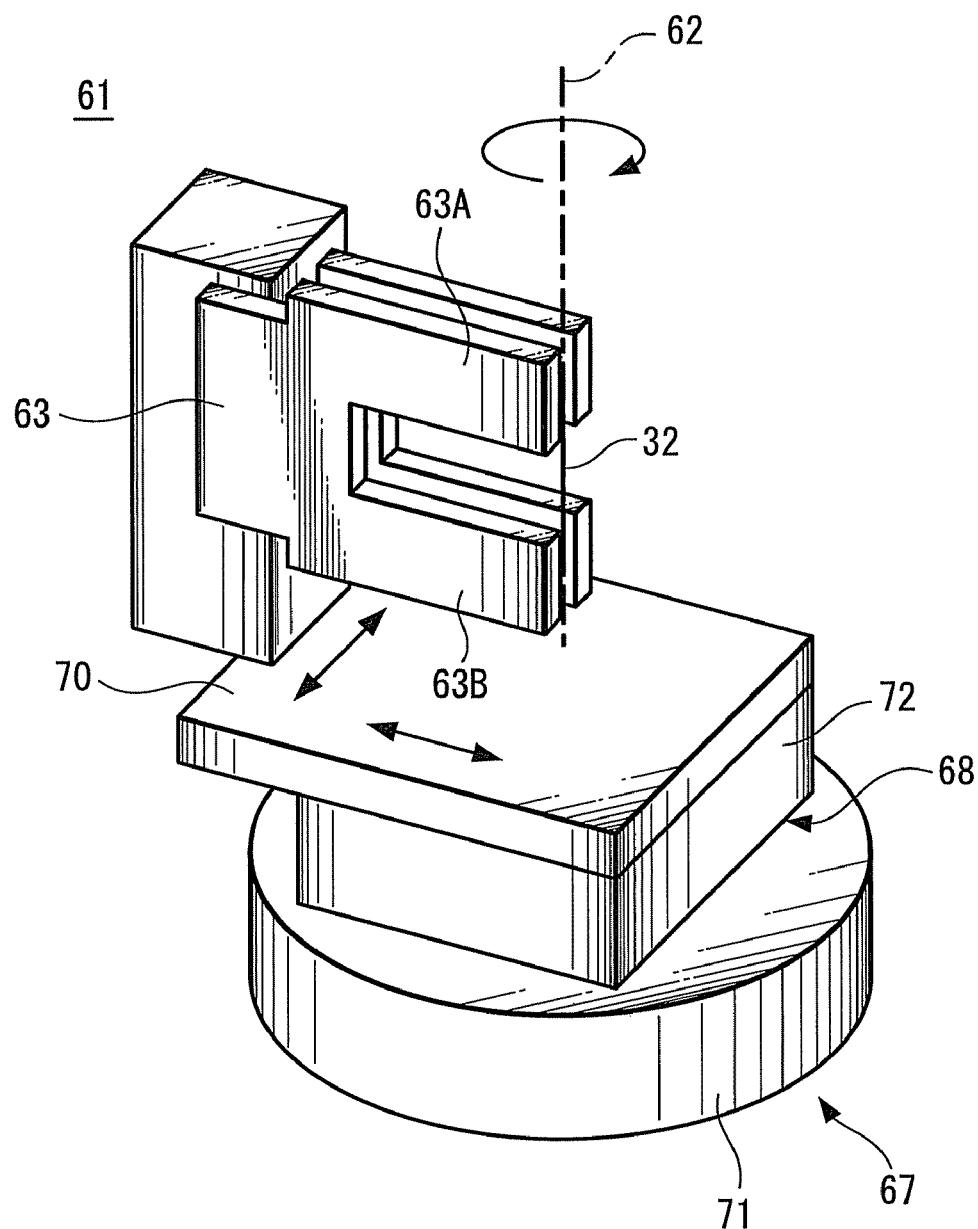
FIG. 4 is a schematic diagram showing an outlined structure of principal portions of a second embodiment of the cutting apparatus according to the present invention.

FIG. 4 shows a second embodiment of the cutting apparatus used for the cutting method according to the present invention. A cutting apparatus 61 according to this embodiment includes a cutting arm 63 having a cutting wire 32; and a rotation mechanism 67 that rotates the cutting arm 63 around a center axis 62 of the wire 32. In addition, like the foregoing first embodiment, the cutting apparatus 61 includes a wire supply/collection unit 35 shown in FIG. 2; a chucking device 38 that holds a workpiece 37 integrally supported by an orthogonal three-axis moving table 36 shown in FIG. 2; and a control means, for example, a computer 39 that issues individual drive commands shown in FIG. 2 (these sections are not shown in FIG. 4).

Figure 5:
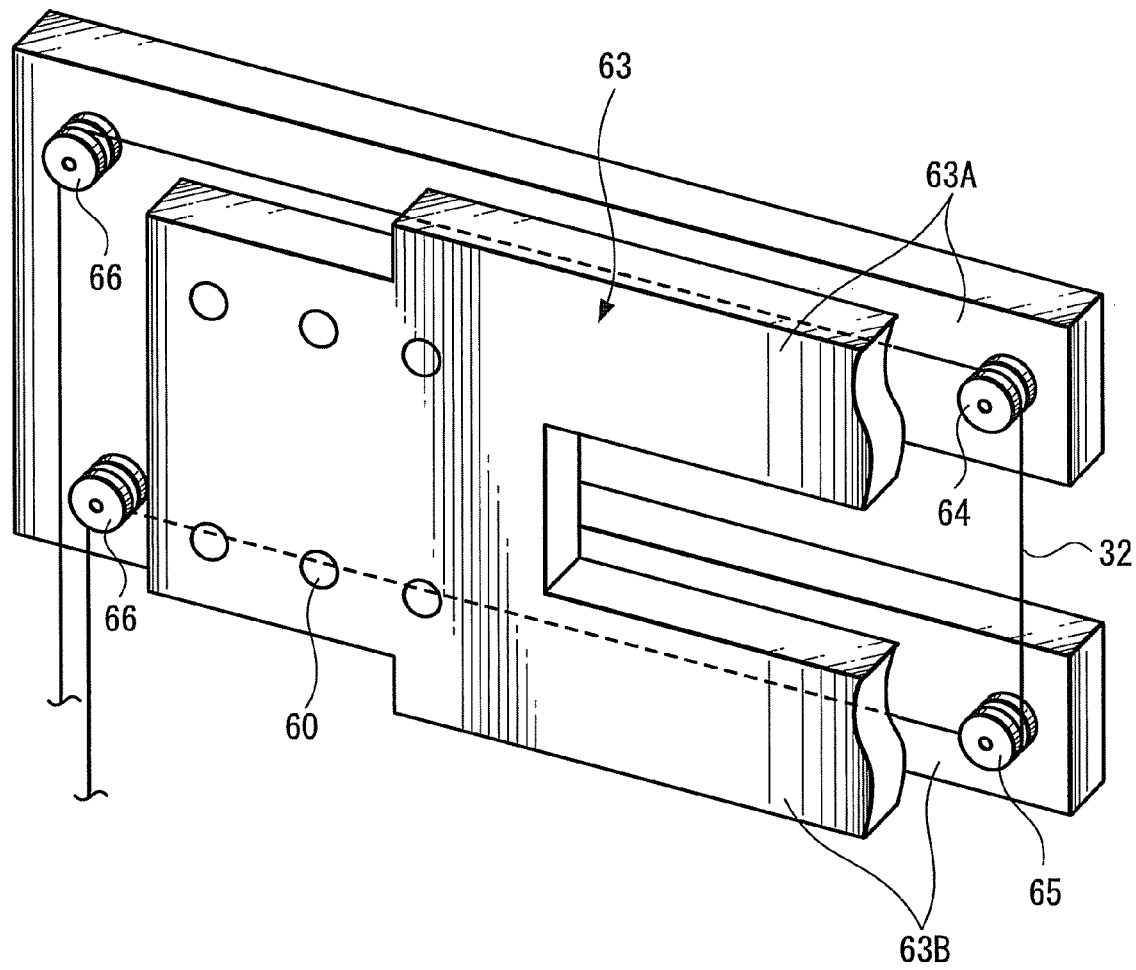
FIG. 5 is an enlarged perspective view showing principal portions of FIG. 4.

As shown in a partially enlarged view of FIG. 5, the cutting arm 63 is formed, for example, in a "]" letter shape. Two grooved guide rollers 64 and 65 are disposed such that they are housed at the respective distal sides of upper and lower arm sections 63A and 63B, respectively. Traveling guides 66 for the wire 32 are disposed on the proximal side of the cutting arm 63. The cutting wire 32 is structured such that it is vertically extended between the grooved guide rollers 64 and 65, exposed between the upper and lower arm sections 63A and 63B, guided by the travelling guides 66, and is traveled.

The rotation mechanism 67 is composed of a rotation table 71. The rotation table 71 can be composed of a so-called rotation stage. The rotation table 71 is rotated according to a command received from the computer 39. Disposed on the rotation table 71 is an X-Y moving mechanism 68, for example, an X-Y table 72 that can be moved in an X axis direction and a Y axis direction perpendicular thereto on a horizontal plane of the rotation table 71. The foregoing cutting arm 63 is fixedly disposed on a support table 70 integrated to the X-Y table 72.

Since the other structures including the wire supply/collection unit 35, the chucking device 38 holding the workpiece 37, the moving table 36, the computer 39, and so forth are the same as those of the foregoing first embodiment, their redundant description will be omitted and will their illustrations be.

In addition to the operation of the cutting apparatus 61 according to the second embodiment, the cutting method thereof will be described. Before cutting processing is performed, the wire's center axis 62 of the cutting arm 63 is matched with the center of rotation of the rotation table 71. In other words, the cutting arm 63 is aligned through the X-Y table 72 such that the wire's center axis 62 of the cutting wire 63 vertically extended between the grooved guide rollers 64 and 65 on the distal side of the cutting arm 63 matches the center of rotation of the rotation table 71. This alignment may be performed manually by operating the X-Y table 72 or the X-Y table 68 may be automatically aligned according to a command received from the computer 39. In this state, the cutting wire 32 is traveled according to a command received from the computer 39. In addition, according to a command received from the computer 39, the moving table 36 is driven, the cutting portion of the workpiece 37 is moved to the center of the wire 32 of the cutting arm 63, and the workpiece 37 is pressed to the wire 32.

Thereafter, the moving direction of the moving table 36 to the wire 32 is controlled by the computer 39 such that the processing force is applied in the cutting direction of the workpiece 37. At the same time, the rotation table 71 is rotated according to a command received from the computer 39 and the orientation of the cutting arm 63 is matched with the cutting direction (see FIG. 2C). In this state, cutting processing is performed. When the cutting direction is changed, the direction of the processing force of the workpiece 37 is correspondingly changed through the moving table 36. At the same time, cutting processing is performed such that the cutting arm 63 is rotated only by a predetermined angle θ through the rotation table 71, the support direction of the total stiffness (Ka) that supports the wire 32 is matched with the direction of the processing force.

Also, in the cutting method using the cutting apparatus 61 according to the second embodiment, as well as cutting processing for a straight shape, cutting processing for complicated shapes such as a sine shape and a free curve with high aspect ratios and fine cutting widths can be precisely performed. In addition, cutting processing can be performed regardless of materials of workpieces such as conductive materials and non-conductive materials. Since the support direction of the total stiffness (Ka) that supports the wire 32 such as the grooved guide rollers 54, 55, and so forth is matched with the processing force (Fn), the same effect as that described in the foregoing first embodiment can be obtained, for example, in which the wire 32 that is disposed along the grooves of the grooved guide rollers 54, 55 does not abrade the groove walls.

Next, a cutting method and a cutting apparatus according to a third embodiment, which can more precisely perform cutting processing, will be described.

Figure 6:
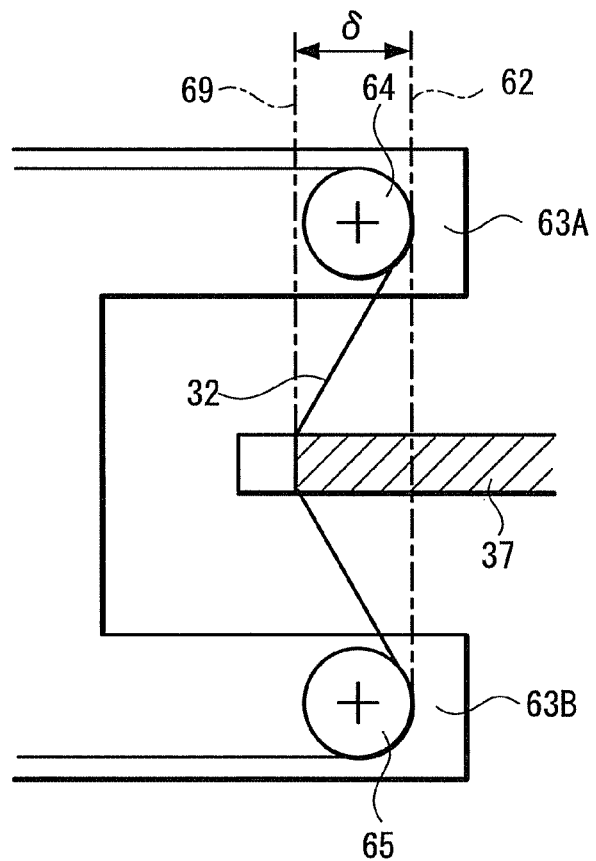
FIG. 6 is a schematic diagram describing a real processing state of a cutting wire.

Next, the state of the wire 32 that actually performs cutting processing will be examined, for example, using the cutting apparatus 61 shown in FIG. 4. As shown in FIG. 6, when cutting processing is performed, a position 69 at which the wire 32 contacts and substantially cuts the workpiece 37 (hereinafter, this position is referred to as the real cutting position of the wire) is behind the wire's center axis 62 of the wire extended vertically between both the foregoing grooved guide rollers 64 and 65. In other words, since the wire 32 presses the workpiece 37 with a required processing force, the wire 32 bends in a bow shape due to its reaction. Thus, the real cutting position 69 of the wire 32 moves with a delay of a distance δ from the wire's center axis 62. In this state, if the cutting direction is changed and the cutting arm 63 is correspondingly rotated around the wire's center axis 62 (see FIG. 2C), an abnormal cutting shape in which the workpiece 37 partly protrudes nearly at the change point occurs as shown in FIG. 7.

Figure 7:
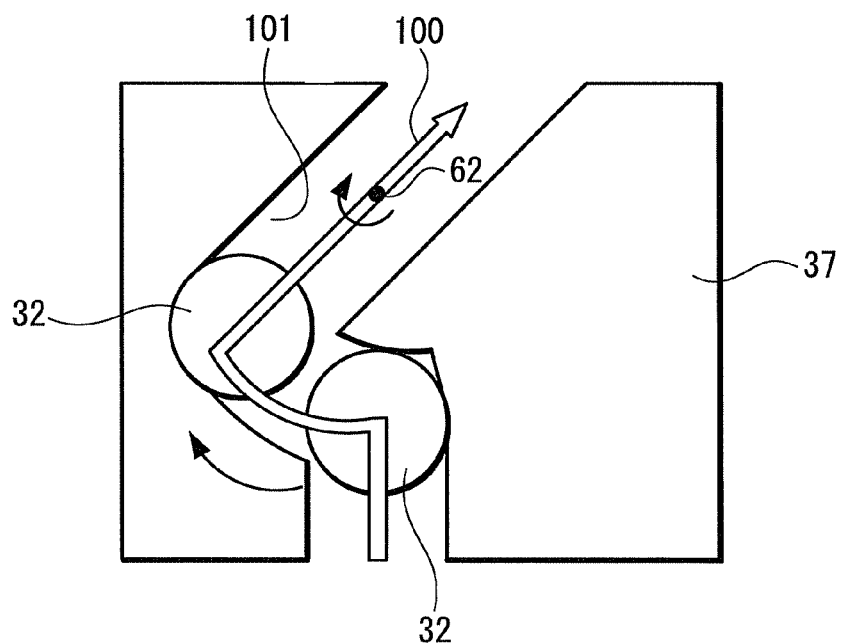
FIG. 7 is a schematic diagram describing a cutting shape in which a center axis of a wire is at a center of rotation of a cutting arm.

As is clear from FIG. 7, this results from the fact that since the wire's center axis 62 deviates from the real cutting position 69 of the wire 32 by the distance δ (see FIG. 6), the wire 32 at the real cutting position is rotated along with the cutting arm 63 around the wire's center axis 62.

Thus, cutting processing for curved shapes or bent shapes having sharp angles with higher accuracies is desired.

Next, the cutting method and the cutting apparatus that can perform cutting processing for curved shapes or bent shapes having sharp angles with higher accuracies according to the third embodiment of the present invention will be described.

The cutting method and the cutting apparatus according to the third embodiment are structured such that the workpiece is cut while a predetermined rotation axis of the cutting arm treated as the real cutting position, which changes, of the wire that contacts the workpiece is controlled to be matched with the reference rotation axis.

Figure 8:
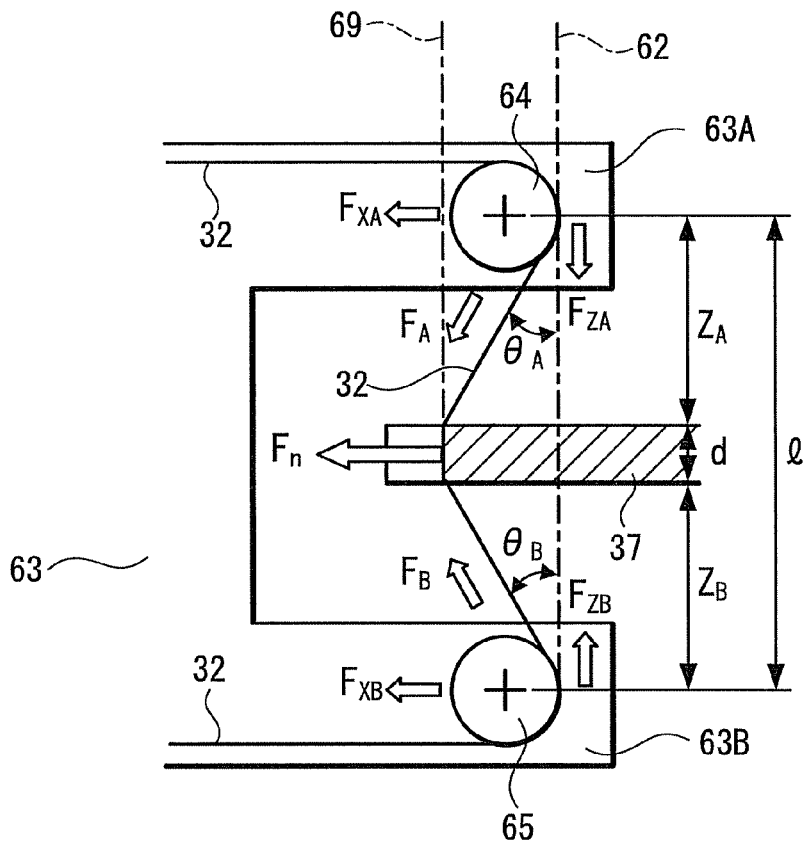
FIG. 8 is a schematic diagram describing an example of a detection method of a real cutting position of a wire according to a third embodiment of the present invention.

First, with reference to FIG. 8, the method of detecting the real cutting position, namely a position delayed from the wire's center axis, will be described. In FIG. 8, the grooved guide rollers 64, 65 are disposed on the respective distal sides of the upper and lower arm sections 63A and 63B of the "]"-letter-shaped cutting arm 63. Before processing, the cutting wire 32 is straightly extended between the grooved guide rollers 64 and 65. At this point, the wire 32 is present on the wire's center axis 62. When cutting processing is performed, the real cutting position 69 of the wire 104 retreats from the wire's center axis 62 where the wire 32 was present before cutting was started.

Figure 9:
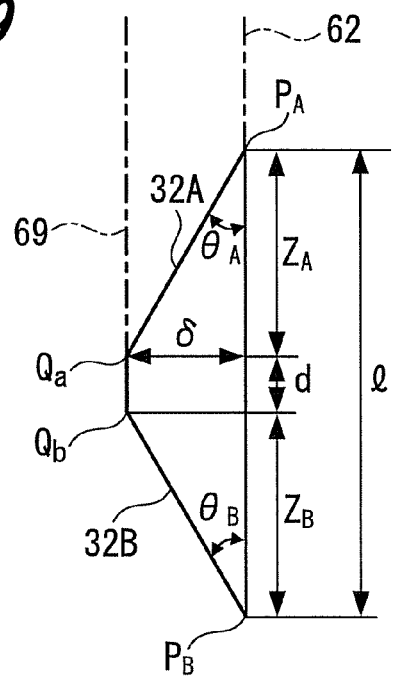
FIG. 9 is a schematic diagram describing a calculation expression of the detection method of FIG. 8.

The real cutting position 69 of the wire 32 is obtained by the distance δ from the wire's center axis 62. The distance δ can be obtained from the following formulas 1 and 2. As shown in FIG. 9, now, it is assumed that the distance between a contact point $P_A$ where the wire 32 contacts the first grooved guide roller 64 and a contact point $P_B$ where the wire 32 contacts the second grooved guide roller 65 is denoted by l. In addition, it is assumed that the thickness of the workpiece 37 is denoted by d. In addition, it is assumed that the distance between a contact point $Q_A$ where the wire 32 contacts the front surface of the workpiece 37 having the thickness d at the real cutting position 69 and the contact point $Q_B$ is denoted by $Z_A$. In addition, it is assumed that the distance between a contact point $Q_B$ where the wire 32 contacts the rear surface of the workpiece 37 having the thickness d at the real cutting position 69 and the contact point $P_B$ is denoted by $Z_B$. In addition, it is assumed that the angle made by a straight wire 32A extending from the contact point $P_A$ and the contact point $Q_A$ is denoted by $\theta_A$ and that the angle made by a wire 32B extending from the contact point $P_B$ to the contact point $Q_B$ and the wire's center axis 62 is denoted by $\theta_B$.

$$\begin{cases} Z_A + Z_B = l - d \\ Z_A \tan\theta_A = \delta \\ Z_B \tan\theta_B = \delta \end{cases} \quad \text{[Formula 1]}$$

The following formula 2 is obtained from formula 1.

$$\delta = (l - d)\frac{\tan\theta_A \cdot \tan\theta_B}{\tan\theta_A + \tan\theta_B} \quad \text{[Formula 2]}$$

On the other hand, as shown in FIG. 8, $\theta_A$ and $\theta_B$ are obtained from tensions $F_A$ and $F_B$ that occur in the wires 32A, 32B during processing, respectively. The tension $F_A$ is the total force of a horizontal component $F_{XA}$ and a vertical component $F_{ZA}$. The tension $F_B$ is the total force of a horizontal component $F_{XB}$ and a vertical component $F_{ZB}$. By detecting the horizontal component $F_{XA}$ and the vertical component $F_{ZA}$ of the tension $F_A$ of the first wire, the tension $F_A$ is obtained as their total force and thereby an angle $\theta_{ZA}$ is obtained. By detecting the horizontal component $F_{XB}$ and the vertical component $F_{ZB}$ of the tension $F_B$ of the second wire, the tension $F_B$ is obtained as their total force and thereby an angle $\theta_{ZB}$ is obtained. Thus, when these angles $\theta_{ZA}$ and $\theta_{ZB}$ are substituted into formula 2, the real cutting position 69 can be detected.

When cutting processing is performed for the workpiece 37 at the center portion of the wire 32 extended between the upper and lower grooved guide rollers 64 and 65, since the angle $\theta_{ZA}$ is equal to the angle $\theta_{ZB}$, by obtaining one of the angles $\theta_{ZA}$ and $\theta_{ZB}$, the distance δ can be obtained from formulas 1 and 2 and thereby the real cutting position 69 can be detected.

Figure 10:
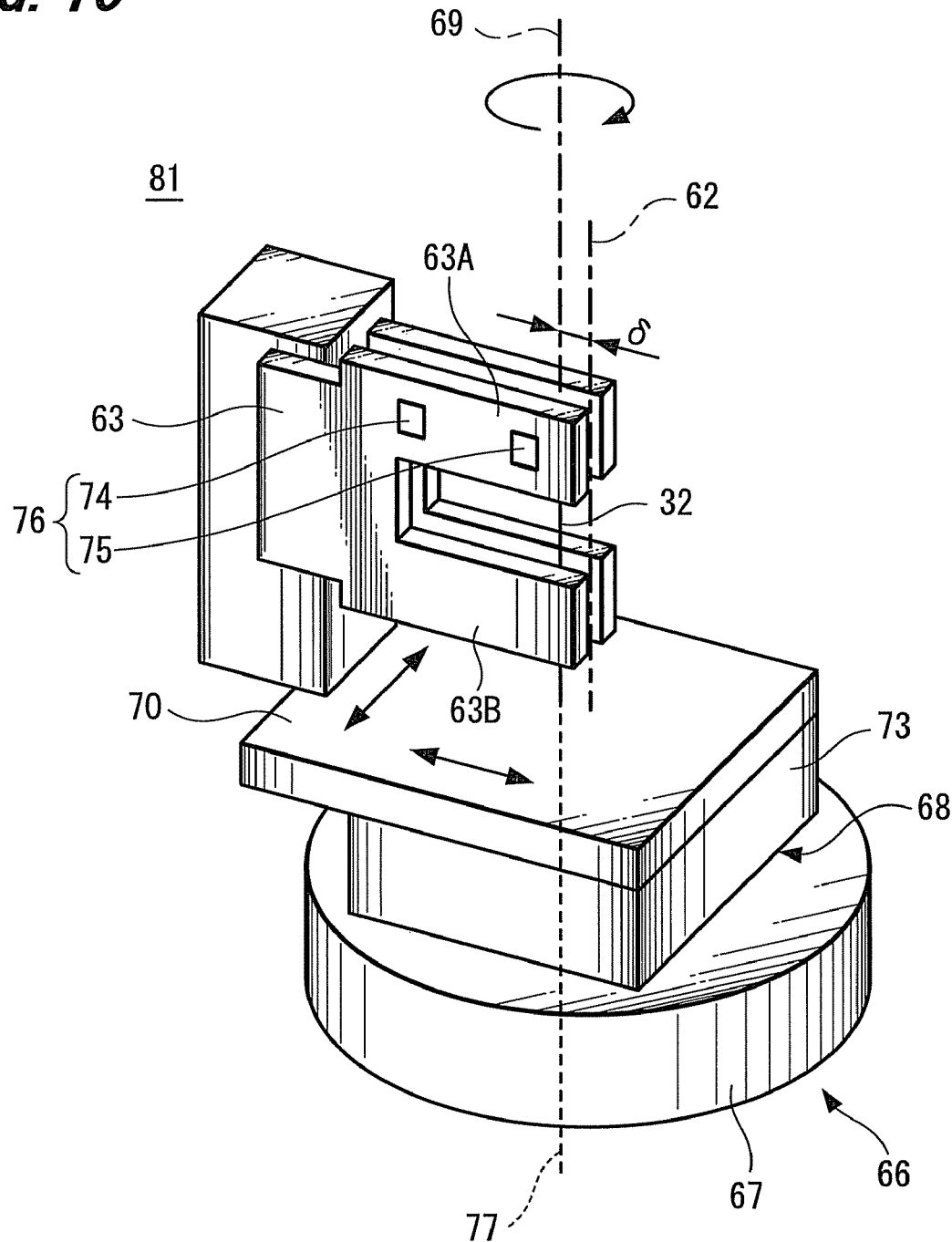
FIG. 10 is a schematic diagram showing an outlined structure of principal portions of the third embodiment of the cutting apparatus according to the present invention.

The cutting method and cutting apparatus according to the third embodiment of the present invention use the method of detecting the real cutting position from the foregoing wire tension. FIG. 10 shows the cutting apparatus according to the third embodiment.

As shown in FIG. 10, the cutting apparatus 81 according to the third embodiment includes a cutting arm 63 having a cutting wire 32; a rotation mechanism 66 that rotates the cutting arm 63; and an X-Y moving mechanism 68. In addition, like the first embodiment, the cutting apparatus 81 also includes a wire supply/collection unit 35 (shown in FIG. 2); a chucking device 38 (shown in FIG. 2) holding the workpiece 37, integrally supported by an orthogonal three-axis moving table 36; and a control means, for example, a computer 39 (shown in FIG. 2) that issues individual drive commands (these sections are not shown in FIG. 10).

Like that of the foregoing second embodiment shown in FIG. 5, the cutting arm 63 is formed, for example, in a "]" letter shape. Two grooved guide rollers 64 and 65 are disposed such that they are housed at the respective distal sides of upper and lower arm sections 63A and 63B, respectively. Traveling guides 66 for the wire 32 are disposed on the proximal side of the cutting arm 63. The cutting wire 32 is structured such that it is vertically extended between the grooved guide rollers 64 and 65, exposed between the upper and lower arm sections 63A and 63B, guided by the travelling guides 66, and is traveled.

The rotation mechanism 66 is composed of a rotation table 71. The rotation table 71 can be composed of a so-called rotation stage. The rotation table 71 is rotated according to a command received from the computer 39. Disposed on the rotation table 71 is an X-Y moving mechanism 68, for example, an X-Y table 73 that can be moved in an X axis direction and a Y axis direction perpendicular thereto on a horizontal plane of the rotation table 71. The foregoing cutting arm 63 is fixedly disposed on a support table 70 integrated to the X-Y table 73. The X-Y table 73 is structured such that it can be manually operated or automatically operated according to a command received from the computer 39.

Since the other structures are the same as those of the first embodiment, their redundant description will be omitted.

In particular, this embodiment is structured such that a rotation axis 77 of the cutting arm 63 is matched with the real cutting position 69 (see FIG. 9) of the wire 32. In other words, the cutting arm 63 is structured such that while it is cutting the workpiece 37, the cutting arm 63 rotates around the real cutting position 69 where the wire 32 substantially contacts the workpiece 37.

In addition, a position detection means 76 that detects the real cutting position 69 during cutting process for the workpiece 37 is provided. In this example, the position detection means 76 is composed of a means that detects the tension of the wire. As the position detection means 76, for example, strain sensors 74, 75 are used. Thus, the strain sensors 74, 75 are mounted on the upper arm section 63A of the cutting arm 63 to detect the vertical component $F_{ZA}$ and the horizontal component $F_{XA}$ of the tension $F_A$ of the wire 32 described with reference to FIG. 8 (see FIG. 10).

The strain sensor 74 is a sensor that detects the vertical component $F_{ZA}$. Since the vertical component $F_{ZA}$ corresponds to a rotational moment, the strain sensor 74 is disposed at a portion corresponding to the proximal section of the upper arm section 63A where its strain becomes maximum. On the other hand, the strain sensor 75 is a sensor that detects the horizontal component $F_{XA}$. Since the horizontal component $F_{XA}$ corresponds to a compression force, the strain sensor 75 is disposed at a portion immediately behind the grooved guide roller 64 of the upper arm section 63A. Although the strain sensor 75 may be disposed at any position of the upper arm section 63A, it is preferred that the strain sensor 75 be disposed apart from the strain sensor 74 because of easy wirings.

Next, in addition to the operation of the cutting apparatus 81 according to the third embodiment, the cutting method thereof will be described. First, the workpiece 37 is processed to set up the reference real cutting position 69. In other words, straight processing is performed, for example, at a constant feed speed so as to obtain the reference real cutting position 69 of the wire (namely, the distance δ) from formulas 1 and 2 based on the real cutting position 69 in the stable cutting processing state. If the wire that contacts the workpiece 37 is at the center of the upper and lower grooved guide rollers, the real cutting position 69 can be obtained with one angle θA in formulas 1 and 2. The reference real cutting position 69 is set up based on the types (types of material, thickness, and so forth) of the workpiece 37.

Thereafter, the reference real cutting position 69 is matched with the center of rotation of the rotation table 71. In other words, the cutting arm 63 is aligned such that the reference real cutting position 69 matches the rotation table 71. The first alignment can be controlled by manually operating the X-Y table 73. Alternately, the X-Y table 73 may be automatically controlled according to a command received from the computer 39.

Figure 11A:
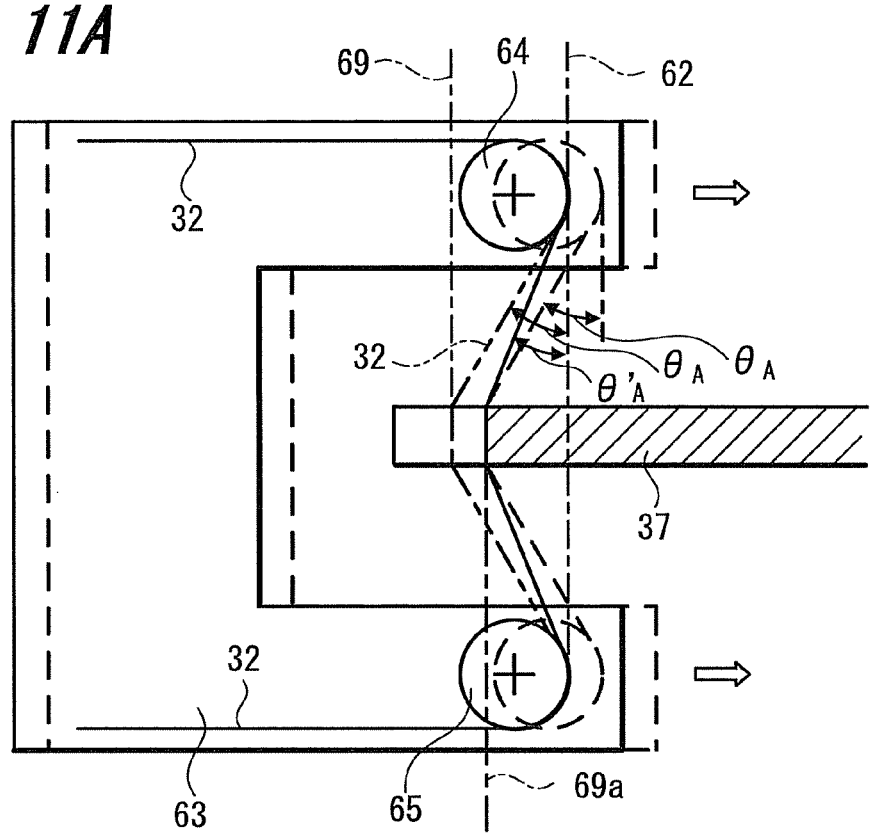
FIGS. 11A and B are schematic diagrams describing an operation of the cutting apparatus of third embodiment.

While the reference real cutting position 69 matches the center of rotation of the rotation table 71, cutting processing for the workpiece 37 is started. It is assumed that during cutting processing, the tension FA of the wire 32 changes, the angle θA changes, and the distance δ changes. For example, as shown in FIG. 11A, it is assumed that the angle of the wire 32 changes to an angle θA' that is smaller than the reference angle θA and the real cutting position 69a moves forward from the reference real cutting position 69 by +Δδ.

At this point, the real cutting position 69a has advanced from the center of rotation of the rotation table and the tension FA of the wire 32 is weaker than the reference tension. The strain sensors 74, 75 detects the vertical component $F_{ZA}$ and the horizontal component $F_{XA}$, respectively, of the wire in this state. The angle $\theta_A'$ is obtained from the ratio of the detected vertical component $F_{ZA}$ and horizontal component $F_{XA}$. As a result, the displacement amount +Δδ of the real cutting position of the wire 32 is obtained. When the cutting speed is kept constant, a detection signal corresponding to the displacement amount +Δδ is fed back to the X-Y table 73 such that the entire cutting arm 63 is advanced by the displacement amount +Δδ and the real cutting position 69a is matched with the center of rotation of the rotation table 73.

Figure 11B:
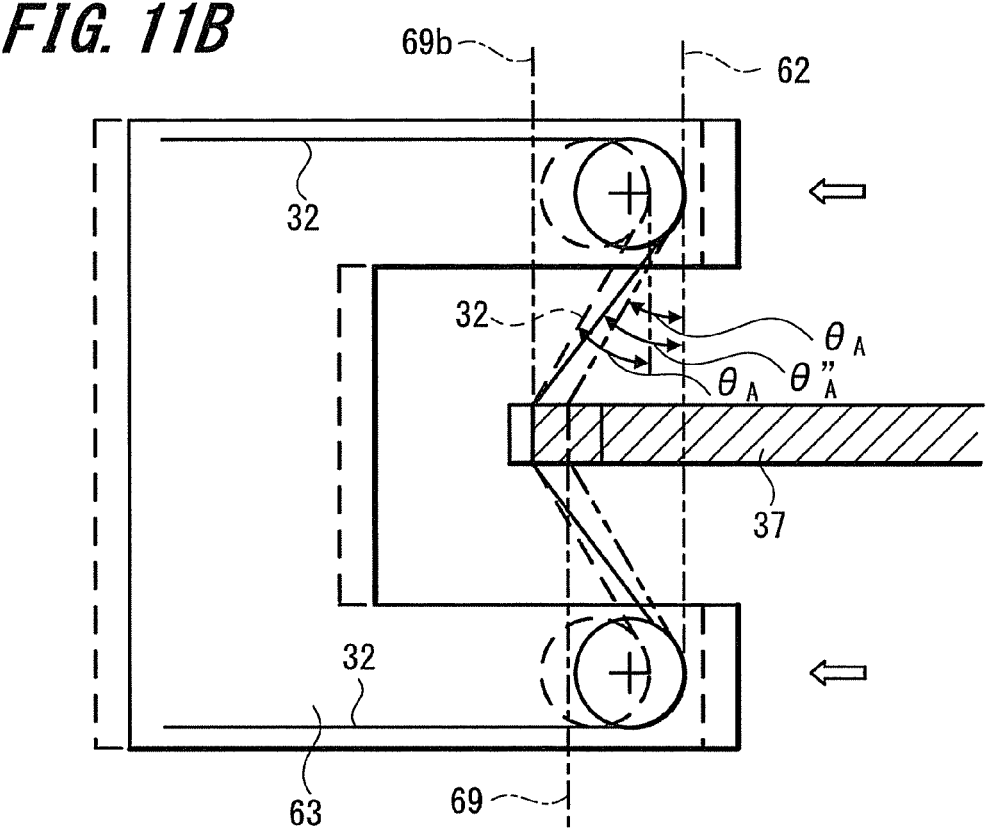

Next, in contrast, for example, as shown in FIG. 11B, it is assumed that the angle of the wire 32 changes to an angle θA" larger than the reference angle θA and the real cutting position 69b retreats from the reference real cutting position 69 by −Δδ. At this point, the real cutting position 69b has retreated from the center of rotation of the X-Y table 73, causing the tension $F_A$ of the wire 32 to become stronger than the reference tension.

The strain sensors 74, 75 detect the vertical component $F_{ZA}$ and horizontal component $F_{XA}$ of the wire 32 in this state. The foregoing angle $\theta_A''$ is obtained from the ratio of the detected vertical component $F_{ZA}$ and horizontal component $F_{XA}$. As a result, the displacement amount −Δδ at the real cutting position of the wire 32 is obtained. When the cutting speed is kept constant, a detection signal corresponding to the displacement amount −Δδ is fed back to the X-Y table 73 such that the entire cutting arm 63 is retreated by the displacement amount −Δδ and the real cutting position 69b is matched with the center of rotation of the rotation table 73.

When the cutting direction is changed, the cutting arm 63 is rotated around the real cutting position 69 such that the orientation of the cutting arm 63 matches the changed cutting direction. This rotation control is performed by rotating the rotation table 73 according to a command received from the computer 39.

In the cutting method and the cutting apparatus 81 according to the third embodiment, the real cutting position 69 is defined as the center of rotation of the cutting arm 63 and cutting processing is performed such that the real cutting position 39 is always matched with the center of rotation of the X-Y table 73 under the control of the computer and the wire tension is kept constant based on the angle $\theta_A$ and distance δ, resulting in performing cutting processing in curved shapes or bent shapes having sharp angles with more higher accuracies.

Figure 12A:
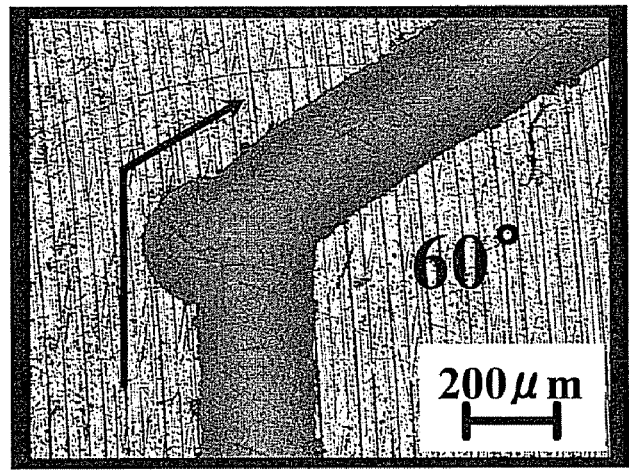
FIGS. 12A and B are microscopic photos showing cutting shapes.
Figure 12B:
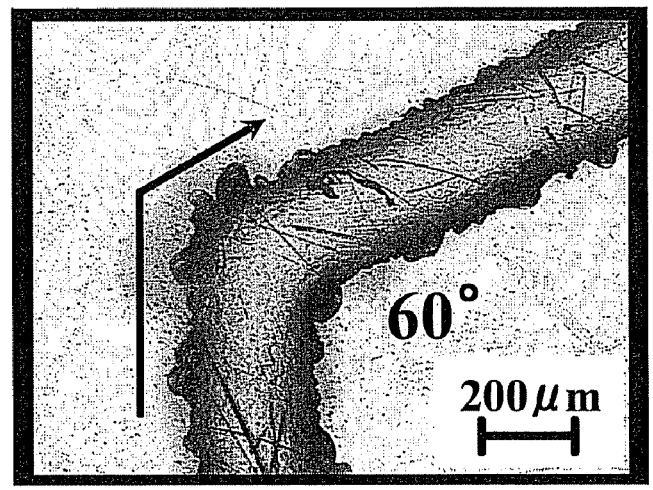
Figure 13:
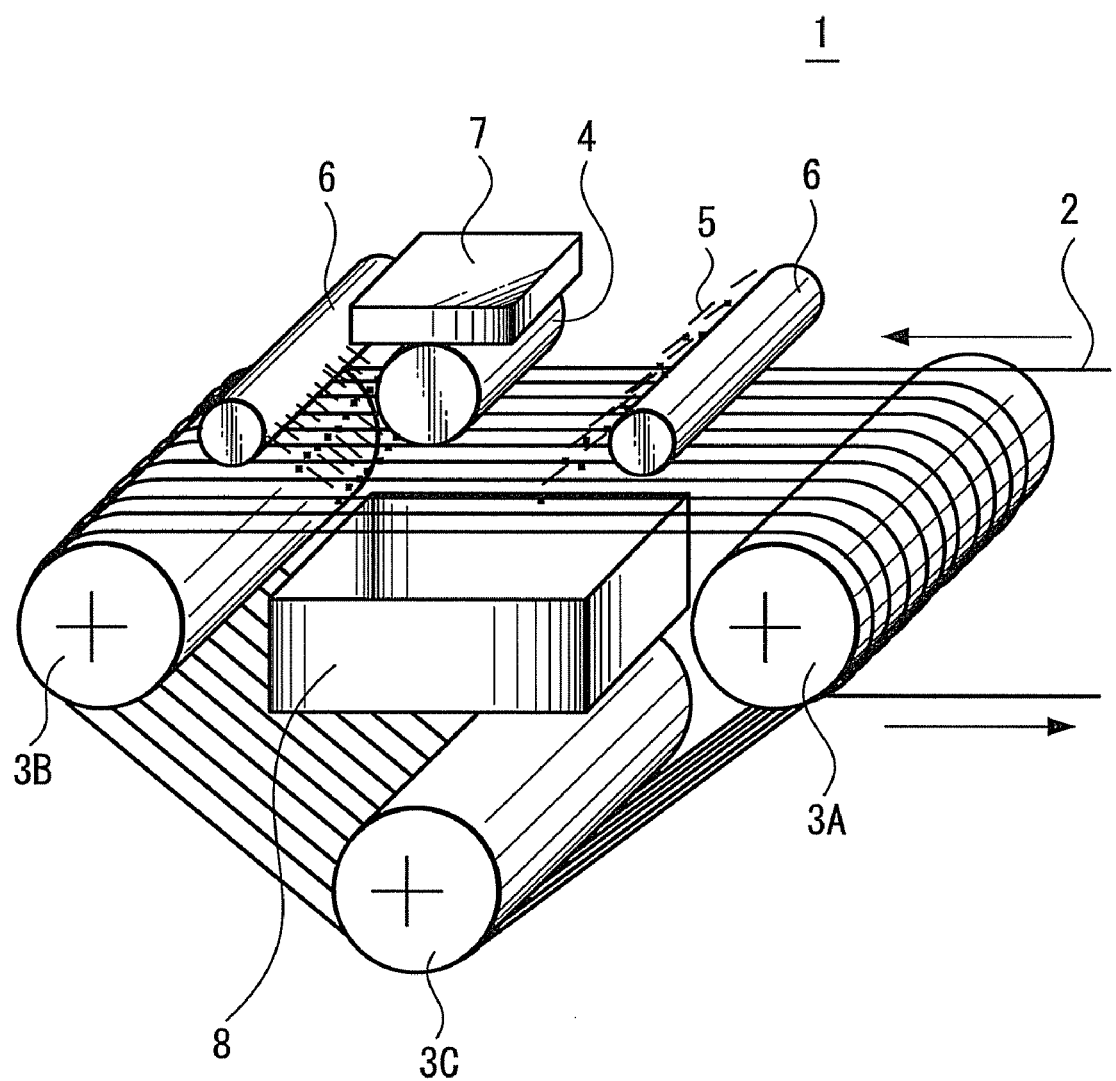
FIG. 13 is a schematic diagram showing principal portions of a cutting apparatus using a conventional wire saw.

For example, cutting states in which cutting directions are changed by 60° will be compared. When the rotation axis of the cutting arm 63 shown in FIG. 4 is matched with the wire's center axis 62, as shown in FIG. 12A, a protrusion portion occurs where the cutting directions are changed. In contrast, when the rotation axis of the cutting arm 63 shown in FIG. 10 is matched with the real cutting position 69, as shown in FIG. 12B, no extrusion portion occurs where the cutting directions are changed, resulting in performing cutting with a sharp angle.

Also, in the cutting method and the cutting apparatus according to the third embodiment, like the foregoing embodiment, as well as cutting processing for a straight shape, cutting processing for complicated shapes such as a sine shape and a free curve with high aspect ratios and fine cutting widths can be precisely performed. In addition, cutting processing can be performed regardless of materials of workpieces such as conductive materials and non-conductive materials. Since the support direction of the total stiffness (Ka) that supports the wire 32 such as the grooved guide rollers 54, 55, and so forth is matched with the processing force (Fn), the same effect as that described in the foregoing first embodiment can be obtained, for example, in which the wire 32 that is disposed along the grooves of the grooved guide rollers 54, 55 does not abrade the groove walls.

In the foregoing third embodiment, the displacement amount Δδ is corrected by advancing or retreating the entire cutting arm 63 at a constant cutting speed. Instead, the displacement amount Δδ may be corrected by increasing or decreasing the cutting speed, so called the feed speed of the workpiece, without necessity of controlling the X-Y table 73.

In the foregoing third embodiment, the real cutting position 69 (namely, the distance δ) is detected from the wire tension. Alternatively, the real cutting position 69 may be optically and directly detected and the detection signal may be fed back to the X-Y table 73. However, as was described with reference to FIG. 10, because of influence of cutting chips that occur in cutting processing, in the method of detecting the wire tension, obtaining the angle θA, and detecting the displacement amount Δδ, a more accurate detection value is obtained than in such an alternative method.

The cutting methods and cutting apparatus of the foregoing embodiments can be suitably applied, for example, to NC machine tools.

DESCRIPTION OF REFERENCE NUMERALS

1 . . . wire, 2 . . . processing force (Fn), 3 . . . total stiffness (Ka), 4 . . . wire feed direction, 5 . . . force of horizontal component, 31, 61, 81 . . . cutting apparatus, 32 . . . wire, 33 . . . cutting arm, 34 . . . rotation mechanism, 35 . . . wire supply/collection unit, 36 . . . moving stage, 37 . . . workpiece, 38 . . . chucking device, 39 . . . computer, 40 . . . rotation bearing, 42 . . . supply drum, 43 . . . takeup drum, 44 . . . drive motor, 45 . . . connection section, 46 . . . drive belt, 51 . . . wire's center axis, 52 . . . travelling direction of wire, 54, 55 . . . grooved guide roller, 56 . . . traveling guide, 58 . . . rotation motor, 62 . . . wire's center axis, 63 . . . cutting arm, 63A . . . upper arm section, 63B . . . lower arm section, 64, 65 . . . grooved guide roller, 66 . . . traveling guide, 67 . . . rotation mechanism, 68 . . . X-Y moving mechanism, 69, 69a, 69b . . . real cutting position, 70 . . . support table, 71 . . . rotation table, 72, 73 . . . X-Y table, 74, 75 . . . strain sensor, 76 . . . position detection means, 77 . . . rotation axis of cutting arm

The invention claimed is:

1. A cutting method using a wire saw, characterized in that the cutting method comprises:
providing a fixed base having a rotatable portion,
providing a cutting arm mounted on the rotatable portion, the cutting arm extending a working portion of a traveling cutting wire across a workpiece; and
using a control mean to control the rotatable portion to rotate the cutting arm around a center axis of the working portion of the wire, the control means compensating for deflection of said wire when a workpiece is cut, the control means rotating the cutting arm such that a cutting direction of the wire matches an arm support direction to increase the stiffness of the wire; and
performing cutting processing for a workpiece.

2. The cutting method as set forth in claim 1, characterized in that cutting method further comprises: extending the wire between a pair of grooved guide rollers disposed on the cutting arm; and traveling the wire.

3. The cutting method as set forth in claim 1, characterized in that the cutting method further comprises: detecting a displacement amount between the center of rotation of the cutting arm and a real cutting position of the wire; and controlling the wire cutting position such that it matches the center of rotation of the cutting arm based on the displacement amount.

4. The cutting method as set forth in claim 3, characterized in that controlling the real cutting position of the wire is performed by detecting a tension of the wire.

5. The cutting method as set forth in claim 3, characterized in that controlling the real cutting position of the wire is performed by directly detecting the real cutting position.

6. A wire saw cutting apparatus comprising:
a fixed base having a rotatable portion,
a cutting arm mounted on the rotatable portion, the cutting arm configured to extend a cutting wire such that a working portion of the wire is exposed across a workpiece receiving gap; and
a control means configured to rotate the cutting arm around a center axis of the working portion of the wire, the control compensating for deflection of said wire when a workpiece is cut, the control means rotating the cutting arm such that a cutting direction of the wire matches an arm support direction to increase the stiffness of the wire.

7. The wire saw cutting apparatus as set forth in claim 6, characterized in that the wire saw cutting apparatus further comprises: a cutting wire supply/collection unit, a pair of grooved guide rollers that guide the wire being disposed on the cutting arm, the wire being extended between the pair of grooved guide rollers such that the wire reciprocally travels therebetween.

8. A wire saw cutting apparatus as set forth in claim 6, characterized in that the wire saw cutting apparatus further comprises:
   an X-Y moving mechanism disposed on the rotatable portion and on which the cutting arm is fixed; the control means controlling the X-Y moving mechanism, when a workpiece is cut, the X-Y moving mechanism being controlled such that a center of rotation of the cutting arm matches a real cutting position where the wire always contacts the workpiece.

9. The wire saw cutting apparatus as set forth in claim 8, characterized in that the wire saw cutting apparatus further comprises:
   a cutting wire supply/collection unit, a pair of grooved guide rollers that guide the wire being disposed on the cutting arm, the wire being extended between the pair of grooved guide rollers such that the wire reciprocally travels therebetween.

10. The wire saw cutting apparatus as set forth in claim 8, characterized in that a displacement amount between the center of rotation of the cutting arm and the real cutting position of the wire is detected, the X-Y moving mechanism is controlled by the control means based on the displacement amount, and the real cutting position of the wire is matched with the center of rotation of the cutting arm.

11. The wire saw cutting apparatus as set forth in claim 8, characterized in that a strain sensor configured to detect the real cutting position of the wire from a tension of the wire is disposed on the cutting arm.

12. The wire saw cutting apparatus as set forth in claim 8, characterized in that the wire saw cutting apparatus further comprises: optical detection means for detecting the real cutting position of the wire.

\* \* \* \* \*